United States Patent [19]

Eickmann

[11] Patent Number: 4,552,054
[45] Date of Patent: Nov. 12, 1985

[54] RADIAL PISTON MACHINE, EMPLOYING A MEDIAL ROTOR BEARING

[76] Inventor: Karl Eickmann, 2420 Isshiki, Hayama-machi, Kanagawa-ken, Japan

[21] Appl. No.: 575,621

[22] Filed: Jan. 31, 1984

Related U.S. Application Data

[62] Division of Ser. No. 282,990, Jul. 14, 1981, abandoned, and Ser. No. 232,935, Feb. 9, 1981, abandoned, which is a division of Ser. No. 911,246, May 31, 1978, abandoned, and Ser. No. 910,809, May 30, 1978, abandoned.

[51] Int. Cl.[4] ............................................. F01B 13/06
[52] U.S. Cl. ............................................................ 91/492
[58] Field of Search ................. 91/472, 488, 491, 492, 91/494

[56] References Cited

U.S. PATENT DOCUMENTS

| | | | |
|---|---|---|---|
| 2,303,685 | 12/1942 | Eden et al. | 91/498 |
| 2,827,859 | 3/1958 | Crane | 91/472 |
| 2,895,426 | 7/1959 | Orshansky, Jr. | 91/492 |
| 2,901,975 | 9/1959 | Grad | 91/497 |
| 3,295,459 | 1/1967 | Griffith | 91/488 |
| 3,357,362 | 12/1967 | Orr | 91/492 |
| 3,470,825 | 10/1969 | Gsching | 91/494 |
| 3,650,180 | 3/1972 | Gantschnigg et al. | 91/488 |
| 3,969,986 | 7/1976 | Ohrberg | 91/492 |

FOREIGN PATENT DOCUMENTS

| | | | |
|---|---|---|---|
| 1926624 | 12/1970 | Fed. Rep. of Germany | 91/492 |
| 1073216 | 6/1967 | United Kingdom | 91/506 |

*Primary Examiner*—William L. Freeh

[57] ABSTRACT

A radial piston machine wherein fluid flows through the cylinders which are provided in a rotor, the disclosure provides a radial bearing in the middle between a plurality of at least two radial cylinder groups. Thereby the former bearings which were provided on the ends of the rotor can be reduced to smaller sizes to carry a lower radial load. The provision of the bearing in the middle of the rotor prevents the former miniturization of the control bodies on the ends of the rotor. The control bodies can now be radially enlarged and the restriction of the flow through quantities of fluid through the control bodies is overcome. The devices are now able to operate with a better efficiency and power. In order to obtain these features the medial radial bearing in the middle between the cylinder group must be of the specific structures of this patent application.

4 Claims, 6 Drawing Figures

$$d_{TH} = \sqrt{(\tfrac{\pi}{4})(R_o^2 - R_i^2)\tau G f_b/(z/2)}$$

$$r_{gc} = (2/3)(R_o^3 - R_i^3)/(R_o^2 - R_i^2)$$

RADIAL PISTON MACHINE, EMPLOYING A MEDIAL ROTOR BEARING

REFERENCE TO RELATED APPLICATIONS

This is a divisional application of my co pending patent application Ser. No. 232,935, now abandoned, which was filed on Feb. 9, 1981 and of my patent application Ser. No. 282,990 now abandoned which was filed on July 14, 1981. The mentioned application Ser. No. 232,935 was a divisional of my now abandoned patent applications Ser. No. 910,809, filed on May 30, 1978 and Ser. No. 911,246, filed on May 31, 1978. Benefits of both applications are claimed herewith.

The FIGS. 1 and 2 of the present application correspond fully to FIGS. 25 and 26 of the mentioned parental patent applications. Benefits of May 30 and May 31 of 1978 of the grand parental applications are claimed for FIGS. 1 and 2 of the present application, while benefit of the parental application Ser. No. 282,990 of July 14, 1981 is claimed for FIGS. 3 to 5 of the present application.

BACKGROUND OF THE INVENTION (a) Field of the Invention

The invention relates to radial piston machines or radial chamber machines where fluid flows through a plurality of chamber groups of pluralities of individual working chambers. Those machines are commonly used as pumps, motors, compressors or transmissions for the handling of a fluid which flows through the chambers. The chambers may be radial cylinders, intervane spaces, gear spaces, internal gear spaces or the like.

(b) Description of the Prior Art

In the prior art in the field of the invention, a rotor is commonly borne and revolved in a housing. The flow of fluid under pressure through the chambers in the rotor provides a radial load of considerable size onto the rotor. The rotor had, therefore, at least two bearings, each one on the end of the rotor. That operated very conveniently, when the control body for the flow of fluid through the rotor was inserted into the rotor's hub, as for example, as in my U.S. Pat. Nos. 3,062,151 or 3,223,046 or in other patents.

However, when the control body was located at an end of the rotor, as, for example, in my U.S. Pat. No. 3,850,201, the bearings of the prior art prevented enough space for the application of large diameter control bodies with enough cross-sectional area of the passages for high quantities of flows of fluid.

SUMMARY OF THE INVENTION

The aim and main object of the invention is to overcome, at least partially, the difficulties of the former art. Especially the invention aims to provide and actually does provide a space on the ends of the rotor which is large enough to provide large diameter control bodies of large cross-sectional passage areas on the ends of the rotor.

To obtain this aim, the invention reduces the heretofore used rotor bearings on the ends of the rotor to smaller capacity bearings, whereby they can become dislocated or become narrowed in cross-sectional area. In order to make the described reduction of the rotor bearings on the ends of the rotor possible, the invention now applies a strong radial rotor bearing substantially in the middle between the at least two working chamber groups of the multi-chamber rotor of the radial fluid machine. This medial rotor bearing of the invention is now capable of carrying the major radial load of the rotor. The rotor end bearings can now be built in such a size or location, that the larger space required on the ends of the rotor for the provision of large cross-sectional area control bodies can become applied.

The difficulties of the former art are thereby effectively, at least partially, overcome.

Additional objects and aims of the invention are:

(1) To provide a radial-chamber machine, wherein fluid flows through the individual working chambers of a a plurality of working chamber groups which are provided in a common rotor, while said rotor is revolvingly borne in a housing, wherein said rotor includes at least one pair of working chamber groups and a medial rotor portion between the two groups of said pair of working-chamber groups, and, wherein a radial bearing is provided on said medial portion of said rotor and kept in said housing to carry a major portion of the radial load of said rotor, wherein said radial bearing is a roller bearing without radially inwardly extending bords on the outer ring of the bearing to prevent collection of fluid around the rollers of the said bearing, or; to provide:

(2) The machine of 1, wherein said medial rotor portion is provided between two axial rotor ends which are forming rotor shafts, wherein said shafts are carrying each a separated rotor portion on different ends of said medial portion, wherein each of said separated rotor portions includes at least one of said working chamber groups, wherein said medial portion extends radially outwardly from said shafts, wherein said medial portion is provided with a plurality of axial bores which are extending axially at least into said medial portion from both axial ends thereof, wherein said bores are located radially inwardly of said medial bearing, wherein said bores are individually communicated to respective chambers of said working chambers and thereby form a thrust chamber, and, wherein thrust members are provided axially movable in said thrust chambers and adapted to pressure in said chambers to thrust in the respective direction toward the respective rotor and thereby to press the respective rotor into sealing engagement with the stationary control face on a respective housing portion located on the outer end of the respective rotor; or;

(3) The machine of 1, wherein said medial rotor bearing forms a fluid bearing; or;

(4) The machine of 3, wherein said fluid bearing includes an outer body provided and borne in said housing which forms an inner face and said medial rotor portion is associated to an outer face, wherein said faces are cylindrical faces of substantially equal diameters but are provided with a respective clearance between them to permit said inner face to revolve in said outer face while fluid is passed into said clearance to provide the bearing of said inner face on a fluid film between said faces; or;

(5) The machine of 4, wherein said outer face is formed by the outer face of said medial rotor portion, or;

(6) The machine of 4, wherein a bearing sleeve is provided around said medial rotor portion to be located between said inner face and said medial portion and to form on the ouer periphery of said sleeve said outer face; or;

(7) The machine of 6, wherein said outer face is interrupted by fluid pressure pockets, which are extending into said sleeve and which are communicated to respective spaces of respective pressure of the machine, whereby said pockets are forming with surrounding portions of said outer face a hydrostatic bearing; or;

(8) The machine of 7, wherein plural passages are provided through portions of said medial rotor portion to individually extend from a respective chamber of said chamber groups about 180 degrees to the radially diametric portion of said medial rotor portion into a respective pocket of said pockets; or;

(9) The machine of 8, wherein said passages are partially cut from the radial outside into said medial rotor portion, closed radially outwardly by the inner face of said sleeve and partially are extending through said sleeve into respective individual pockets, when said pockets are provided in said sleeve.

BRIEF DESCRIPTION OF THE DRAWING

FIG. 3 shows the full 360 degrees sectional view through the rotor, while FIG. 1 shows only the upper half of the longitudinal sectional view.

DESCRIPTION OF THE PREFERRED EMBODIMENT

Figure 1:
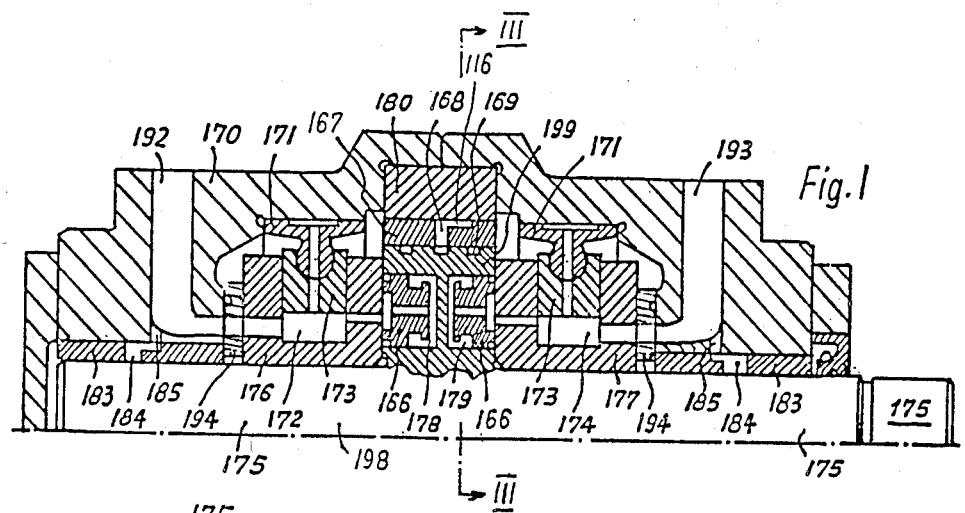
FIG. 1 is a longitudinal sectional view through an upper half of one embodiment of a fluid machine of the invention.
Figure 2:
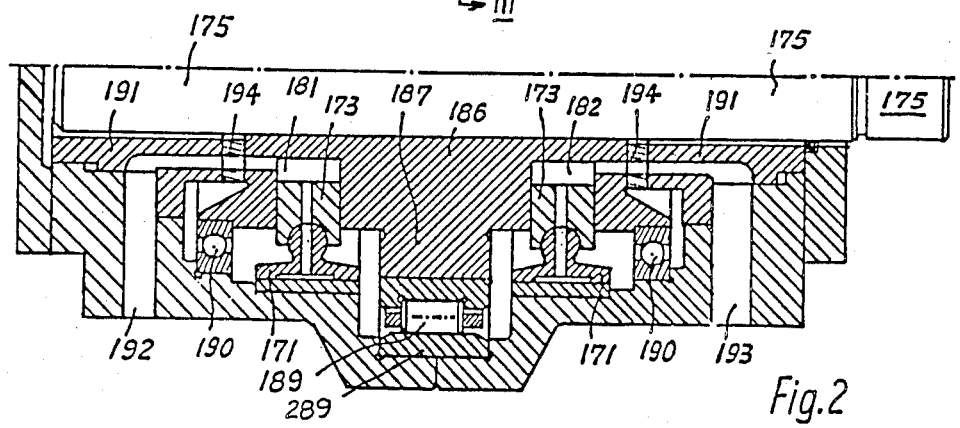
FIG. 2 is a longitudinal sectional view through the bottom half of another embodiment of a fluid machine of the invention.

A considerable difficulty of the fluid machines of the former art is overcome by the embodiments of FIGS. 1 and 2 of the invention.

Formerly the rotor of the fluid machine was commonly borne on both ends of the rotor in the housing. That provided difficulties for the application of a control body or of control bodies on the axial end or ends of the rotor. Because the control face must by reason of prevention of internal compression losses of fluid in the rotor passages be set axially as close to the working chambers or cylinders as possible. But the control bodies on such axial end of the rotor require a certain radial dimension. The inner diameter of the rotor bearings, however, prevented a large radial space at the rotor end where the control-body or bodies had to be located. The ability of the control body on the end of the rotor to move radially and to have the desired radial extension for a smooth operation of the control face(s) was thereby restricted in the known fluid machines of the former art and that resulted sometimes in friction, leakage or wear between the control faces.

This difficulty of the former art is overcome thereby that a main rotor bearing becomes provided in the middle of the rotor between the two working chamber groups. Such main bearing then carries the main load exerted onto the rotor. Thereby it becomes possible to use only very small or light bearings on the ends of the rotor or on the shaft. Much space is thereby obtained to permit the assembly of radially big control bodies or control faces on the end(s) of the respective rotor.

In FIG. 1 the main bearing 180 is a hydrostatic or hydrodynamic radial bearing. It has the outer body 180 wherein the inner body 176 revolves. Individual fluid pressure pockets 116 are provided in the outer face of the inner body for lubrication or hydrostatic load balance between the inner and outer bodies 176 and 180. Fluid under pressure may be led into the individual fluid pressure pockets 116 through passages 169 and 168. The passages 169 extend half way around the medial rotor portion 199 and into a respective working chamber diametrically opposite of the respective fluid pressure pocket 116. Such half-way extension of a passage around a cylindrical body is shown in FIG. 15 of my grand parental applications and it is similarly applied on the medial rotor portion 199 of rotor 198. The inner body 176 may close the said passages or communications 169 radially outwardly.

The application of the main radial bearing on the medial rotor portion between two working chamber groups 172,174 of a rotor assembly facilitates in addition the application of thrust chambers 178,179 in said medial rotor portion. Thrust members 166 are then inserted into said thrust chambers 178 and 179 to press rotor portion 176 against the control plate 194 on the one end of the rotor and to thrust rotor portion 177 against control plate 194 on the other end of the rotor assembly.

Thereby the rotary and stationary control faces of rotor members 176,177 and control plates 194 are sealed. The working chambers 172,174 may be cylinders and may have pistons 173 able to move radially therein. The pistons 173 may be associated to shoes 171 as known in the art. Control plates 194 may be borne on respective faces of the housing 170 or of covers thereof and fluid passages 192,193 may extend through respective housing portions or cover portions.

The capability of the medial bearing, and main bearing 180,167 to bear a high radial load makes it possible to utilize relatively small bearings for low load on the ends of the rotor or shaft 175,198. Even slide bearings around the shaft might be satisfactory because of the high bearing capacity of the said main bearing of the invention. FIG. 1 therefore shows radial fluid bearings 183 mounted on the ends of the machine in the housing 170 thereof and surrounding the shaft 175 in order to help to bear said revolvable shaft 175,198. Passages 185 may pass fluid from the respective passages 192,193 through bores or passages 185,184 into the bearing clearance between the respective portion of the shaft 175 and the bearing sleeve 183 for lubricating and or pressure-balancing the same. The shaft 175 may be integral with the medial rotor portion 199 or they may be separated parts and shaft or rotor portion 198 may carry axially moveable thereon the rotor members 176 and 177.

Means for prevention of rotation of members 176 and 177 relative to rotor portions 199,198 may be set, but they are not shown in the drawing because they may be simple pin means engaging into respective adjacent recesses or bores.

In the embodiment of FIG. 2 the rotor 186 is fastened to shaft 175 and has a medial rotor portion 187 between the working chamber portions with working chambers or cylinders 181 and 182. The cylinders 181 and 182 again carry as known in the art the therein reciprocable pistons 173 with piston shoes 171. The fluid flows to and from the cylinders 181 and 182 through respective control plates 194 through thrust or control bodies 191 from or to ports 192 or 193 respectively. So far the device of FIG. 2 is known in the art. Also known in the art is, that the medial rotor portion 187 is borne in a radial bearing 189.

However, the radial bearings had grooves for rollers or for balls. These grooves filled, as the invention recognizes, with fluid and caused friction when the rollers or balls run in the fluid in the grooves. Deep studies and tests in accordance with this present invention have shown that in some fluid motors or pumps the mechanical efficiency decreased by up to 20 percent, when such bearings were were applied and the pumps or motors run with high revolutions at medial pressures in the fluid. The invention prevents such friction and losses by using the cylindrical outer ring 289 without radially inwardly extending bords. The outer ring obtains thereby a cylindrical configuration. The grooves are thereby prevented and the friction is drasticly reduced. The efficiency at the mentioned values of revolutions per minute and pressure is increased by about fifteen percent.

Thereby this bearing carries the most of the radial load of the rotor 186. Consequently, there remains only a remainder of the load and that can now be born in small bearings 190 which may be located at the ends of the rotors. In the past the load of the rotor was borne by such bearings on the ends of the rotor. Therefore the known art had to supply heavy bearings on the ends of the rotor which restricted the space for the control bodies 191 or moved them too much away from the cylinders 181 or 182. Since now smaller bearings 190 can be used, according to this invention, the end bearings 190 are now smaller and of a shorter axial length than the former heavy rotor end bearings. The now shorter end bearings 190 make it possible according to the invention to move the control bodies 191 axially closer to the cylinders or chanbers 181 and 182. The passage to said chamber are thereby shortened and the internal compression loss in fluid in said passages is reduced. Thereby the efficiency of the machine is increased and so is the power.

The bearings 190 of less bearing capacity than the former can also be radially of a less extension. That makes it possible to provide a radially wider space for the insertion of control bodies 191. Thereby these control bodies can be of bigger diameter than in the former art and, consequently, they can have wider control faces for better operation and better seal under less friction and without the danger of the welding of the control faces on each other.

Since the devices are substantially symmetric relative to the medial line through the shaft or through the axis of the shaft in each of the figures one half is shown. Thereby it is also visibly demonstrated that the fluid machine of the invention may be built either according to FIG. 1 or according to FIG. 2 just depending on actual desire of the bearings to be used; namely either fluid bearing or ball or roller bearings.

Figure 3:
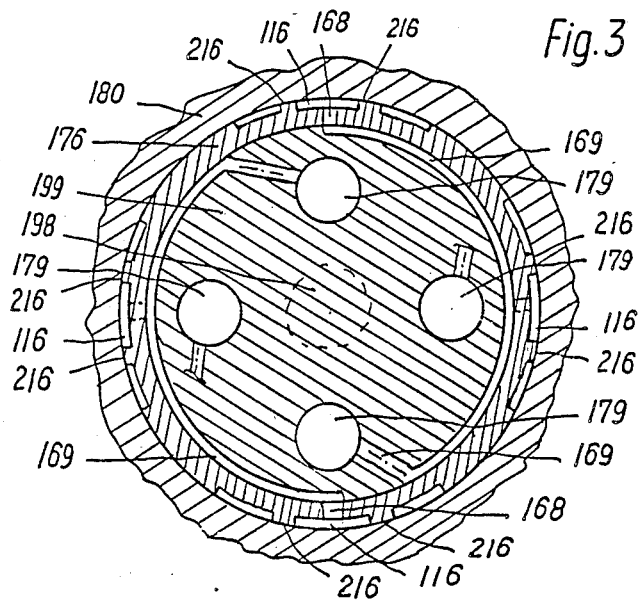
FIG. 3 is a cross sectional view through the rotor of the device of FIG. 1, taken along the line III—III therein; however.

In the cross-sectional FIG. 3 the individual fluid pressure pockets 116 are clearly visible. This Figure also shows, how the respective passages 169 extend from a diametrically oppositionally located chamber 179 half way around the rotor portion 199 into the respective passage 168 and then into the respective individual fluid pressure pocket 116. Seen in this Figure are also the sealing lands 216, which individually surround the respective individual fluid pressure pocket and comprise thereby respective indiviual hydrostatic fluid pressure bearings. Each single fluid pressure bearing 116 is thereby individually communicated to a respective individual chamber 179 and supplied therefrom individually with fluid and alternating pressure in the fluid. The other referential numbers show equal parts as in FIG. 2.

The fluid bearing demonstrated in the middle of FIG. 1 is a novel bearing with novel supply of hydrostatic pressure fluid from one side of a body to the thereto opposite diametric side of a stator or rotor. In addition thereto the said fluid bearing of FIG. 1 has the novel possibility and feature to supply periodically, individually, fluid under pressure from individual spaces under pressure on one side of a body to individual recesses or spaces on the thereto diametric opposite side of such body.

This bearing has, therefore, important novel features and is a fluid bearing with individual local fluid pressure supply. Such novel bearing finds its application not only in the double flow machine of FIG. 1 but it can also be applied in other machines or vehicles where slide bearings are convenient for use. It can also be applied in single flow fluid machines and instead of applying it in the middle between two working chamber groups of a double flow rotor it can also be applied on the ends of rotors or stators or on one end of a rotor or stator.

What is important in FIGS. 1 and 2, and further details of these Figures, may also be described as follows; whereby the passing of the passages 169 halfway around the medial rotor portion 199 is similar to that of passages 82,83 etc., of FIGS. 14 to 19 of my mentioned grand parental applications.

When the fluid bearing in FIG. 1 is built as a hydrostatic bearing in accordance with the description, the force of pressure out of the respective working chambers 172 or 174 is transferred over the plurality of individual passages 169 half way around the medial rotor portion 199 into the respective individual fluid pressure pockets 168 on the diametrically opposite location of the medial rotor portion. There the forces of pressure in fluid are now acting in the oppositional direction onto the rotor 175,199, relative to the forces which act in the respective working chambers or cylinders 172,174.

A suitable location and dimensioning of the fluid pressure pockets 168 in combination with the separated communication over individual passages 169 to the respective diametrically located working chamber or cylinder will be able to make the rotor 175,199 float between the mentioned forces from fluid without major radial forces remaining on the rotor.

The end bearings 183,190, can then become very light bearings because they are then for concentration of the rotor rather than for the bearing of the rotor in a radial direction.

One of the reasons for applying the sleeve 167 or bearing portion 167 around the medial rotor portion 199 is that the passages 169 can be individually drilled radially into the medial rotor portion 199, then milled separately along the outer half of the periphery of the medial rotor portion 199 and become there communicated to respective short radial separate passages through the sleeve 167 into the respective individual and separate fluid pressure balancing recesses or pockets 168 in the outer face of the sleeve or bearing portion or member 167.

Figure 4:
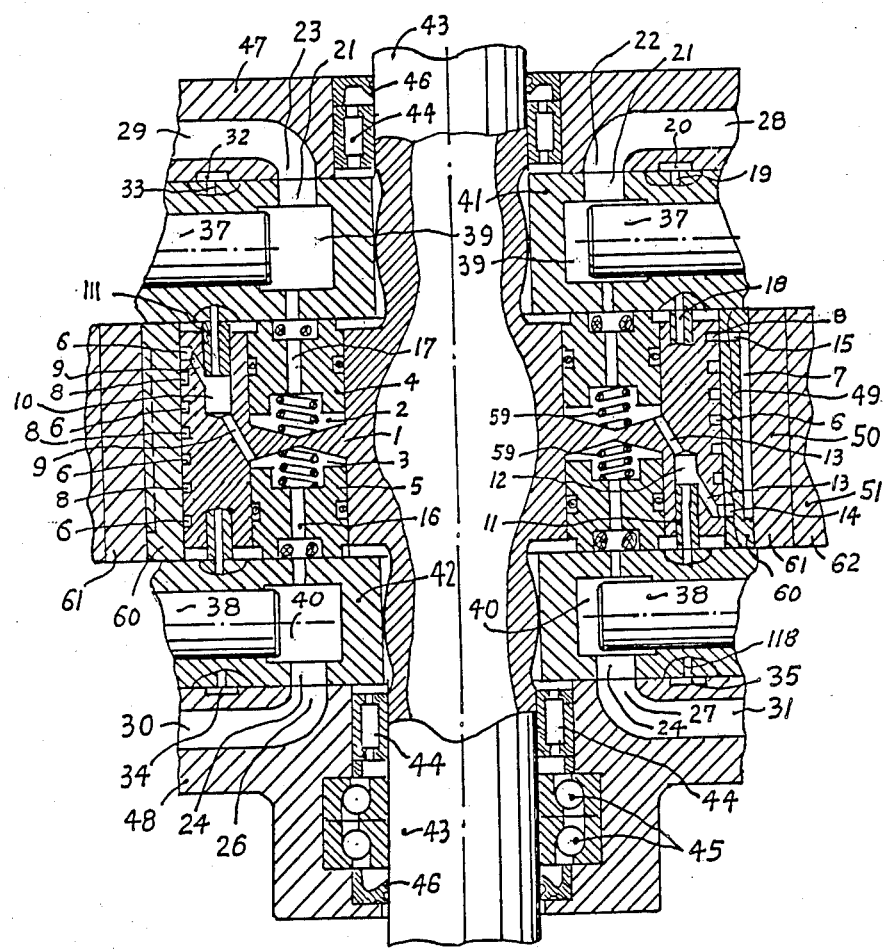
FIG. 4 is a longitudinal sectional view through a portion of a fluid machine of a further embodiment of the invention.
Figure 5:
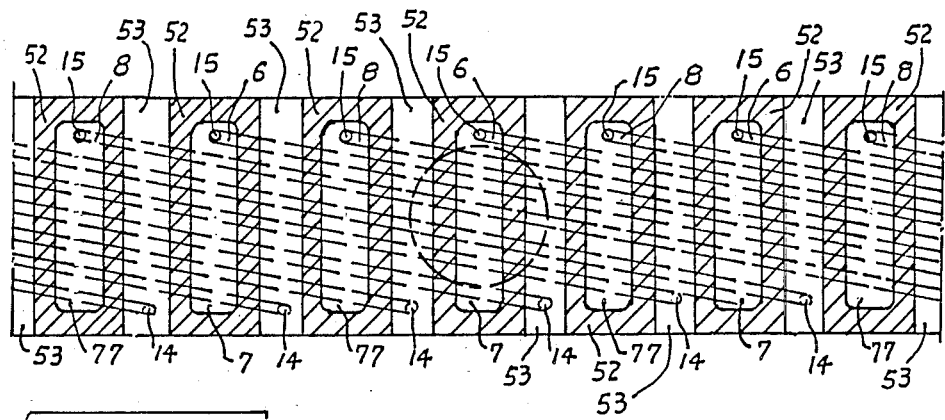
FIG. 5 is a peripheral sectional view through the fluid bearing of FIG. 4.
Figure 6:
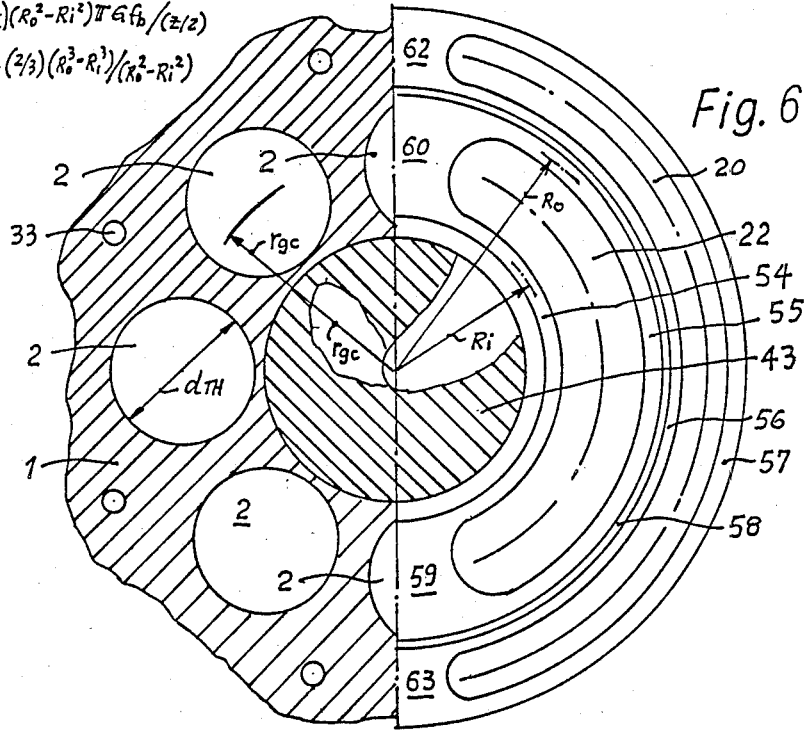
FIG. 6 is a cross sectional view through different locations of FIG. 4.

In FIGS. 4 to 6 a fluid handling device as for example, a hydraulic or hydrostatic pump or motor is demonstrated. It is closely related to the device of FIGS. 1 to 3 and thereby to FIGS. 1 and 2 of my parental application Ser. No. 232,935 which was filed on Feb. 9 of 1981 as a divisional application of my now abandoned applications Ser. Nos. 910,805 and 911,246 which were filed on May 30 and 31 of 1978 respectively.

The devices of my mentioned abandoned patent applications have worked quite satisfactory at common applications.

However at present time it is now required to apply the devices to still higher pressures, relative speeds between adjacent faces and to higher differences in pressure in fluid in the different flows of fluid through the different working chamber groups of the respective devices.

I have now found, that the aim of still higher pressures in flows and of relative speeds between adjacent faces can be obtained only, when certain improvements are added to the devices of my grand parental applications. Such improvements are content of the present embodiment demonstrated in FIGS. 4 to 6.

Accordingly the improvements of this invention consists in the application of second passage- and seal means through the medial portion of the drive rotor to an opposite axial control face portion with a second fluid pressure balancing pocket therein.

Due to an other improvement by this invention, the diameter of the thrust pistons and of the thrust chambers wherein the thrust pistons are axially moveably located, must have a diameter substantially equal or slightly higher than the root of $(pi/4)(Ro^2 - Ri^2)pi\, G\, fb/(Z/2)$.

And, according to an other improvement by this invention, the axes of the thrust chambers and thrust pistons must be located on the integral medial radius "rgc" of the control face, while the said medial radius must correspond to the equation "gc"$=(\tfrac{2}{3})(Ro^3 - Ri^3)/(Ro^2 - Ri^2)$.

Thereby the following two equations should be obeyed in accordance with the respective objects of the respective embodiments of this invention:

$$d_{TH} = (pi/4)(Ro^2 - Ri^2)pi\, G fb/(Z/2) \quad (1)$$

and:

$$r_{gc} = (\tfrac{2}{3})(Ro^3 - Ri^3)/(Ro^2 - Ri^2) \quad (2)$$

with pi=3.1416; G=face percentage, commonly about 0,5 and $f_b$=balancing factor, commonly about 1.06 plus/minus 0.04. While Ro and Ri are the medial radii of the sealing lands around the control ports of the control face as shown in the respective FIG. 6.

What is claimed is:

1. A radial chamber machine,
wherein fluid flows through the individual working chambers of a plurality of working chamber groups which are provided in at least one rotor, while said rotor is revolvingly borne in a housing,
wherein said rotor includes at least one pair of working chamber groups and a medial rotor portion between the two groups of said pair of working-chamber groups,
wherein a radial bearing is provided on said medial portion of said rotor and kept in said housing to carry the major portion of the radial load of said rotor,
wherein said medial rotor bearing forms a fluid bearing,
wherein said fluid bearing includes an outer body provided and borne in said housing, which forms an inner face and said medial rotor portion is associated to an outer face,
wherein said faces are cylindrical faces of substantially equal diameters but are provided with a respective clearance between then to permit said linner face to revolve in said outer face, while fluid is passed into said clearance to provide the bearing of said inner face on a fluid film between said faces,
wherein a bearing sleeve is provided around said medial rotor portion to be located between said inner face and said medial portion and to form on the outer periphery of said sleeve said outer face, and;
wherein said outer face is interrupted by a plurality of fluid pressure pockets, which extend into said sleeve, which are communicated to respective spaces of respective pressure of the machine, and which are equal in number to the number of said working chambers in one of said working chamber groups whereby said pockets form with surrounding portions of said outer face, which comprise sealing lands, a plurality of individual hydrostatic bearings, corresponding in number to the number of said working chambers in one of said working chamber groups.

2. A radial-chamber machine,
wherein fluid flows through the individual working chambers of a plurality of working chamber groups which are provided in at least one rotor, while said rotor is revolvingly borne in a housing,
wherein said rotor includes at least one pair of working chamber groups and a medial rotor portion between the two groups of said pair of working-chamber groups,
wherein a radial bearing is provided on said medial portion of said rotor and kept in said housing to carry the major portion of the radial load of said rotor,
wherein said medial rotor bearing forms a fluid bearing,
wherein said fluid bearing includes an outer body provided and borne in said housing, which forms an inner face and said medial rotor portion is associated to an outer face,
wherein said faces are cylindrical faces of substantially equal diameters but are provided with a respective clearance between them to permit said inner face to revolve in said outer face, while fluid is passed into said clearance to provide the bearing of said inner face on a fluid film between said faces,
wherein a bearing sleeve is provided around said medial rotor portion to be located between said inner face and said medial portion and to form on the outer periphery of said sleeve said outer face,
wherein said outer face is interrupted by a plurality of fluid pressure pockets, which extend into said sleeve and which are communicated to respective spaces of respective pressure of the machine with said plurality of pockets equal in number to the number of said working chambers, whereby said pockets form with surrounding portions of said outer face hydrostatic bearings, equal in number to the number of said working chambers, and;

wherein plural passages are provided through portions of said medial rotor portion to individually extend from a respective chamber of said chamber groups about 180 degrees to the radially diametric portion of said medial rotor portion into a respective pocket.

3. The machine of claim 2, wherein said passages are partially cut from the radial outside into said medial rotor portion, closed radially outwardly by the inner face of said sleeve and partially extend through said sleeve into respective individual pockets.

4. A radial-chamber machine, wherein fluid flows through the individual working chambers of a plurality of working chamber groups which are provided in at least one rotor, while said rotor is revolvingly borne in a housing, wherein said rotor includes at least one pair of working chamber groups and a medial rotor portion between the two groups of said pair of working-chamber groups, wherein a radial bearing is provided on said medial portion of said rotor and kept in said housing to carry the major portion of the radial load of said rotor, wherein said medial rotor bearing forms a fluid bearing, wherein said fluid bearing includes an outer body provided and borne in said housing, which forms an inner face and said medial rotor portion is associated to an outer face, wherein said faces are cylindrical faces of substantially equal diameters but are provided with a respective clearance between them to permit said inner face to revolve in said outer face, while fluid is passed into said clearance to provide the bearing of said inner face on a fluid film between said faces, wherein a bearing sleeve is provided around said medial rotor portion to be located between said inner face and said medial portion and to form on the outer periphery of said sleeve said outer face wherein said outer face is interrupted by fluid pressure pockets, which are extending into said sleeve and which are communicated to respective spaces of respective pressure of the machine, whereby said pockets form with surrounding portions of said outer face a hydrostatic bearing, wherein plural passages are provided through portions of said medial rotor portion to individually extend from a respective chamber of said chamber groups about 180 degrees to the radially diametric portion of said medial rotor portion into a respective pocket, wherein said medial rotor portion is provided between two axial rotor ends which form rotor shafts, wherein said shafts carry each a separated rotor portion on different ends of said medial portion, wherein each of said separated rotor portions includes at least one of said working chamber groups, wherein said medial portion extends radially outwardly from said shafts, wherein said medial portion is provided with a plurality of axial bores which extend axially at least into said medial portion from both axial ends thereof, wherein said bores are located radially inwardly of said medial bearing, wherein said bores are individually communicated to respective chambers of said working chambers and thereby form thrust chambers, wherein thrust members are provided in said thrust chambers and subjected to pressure in said chambers to thrust in the respective axial direction toward the respective rotor and thereby to press the respective rotor into sealing engagement with the stationary control face on a respective housing portion located on the outer end of the respective rotor, and;

wherein said thrust chambers are provided with communication passages and said communication passages extend individually and separatedly into respective pockets of said fluid pressure pockets, whereby each of said thrust chambers is communicated individually with a respective pocket of said fluid pressure pockets on the substantially 180 degrees opposite location of said medial rotor portion.

* * * * *